INVENTOR
James F. Turner and
William H. Bartman
BY Thomas W. Y. Clark
ATTORNEY

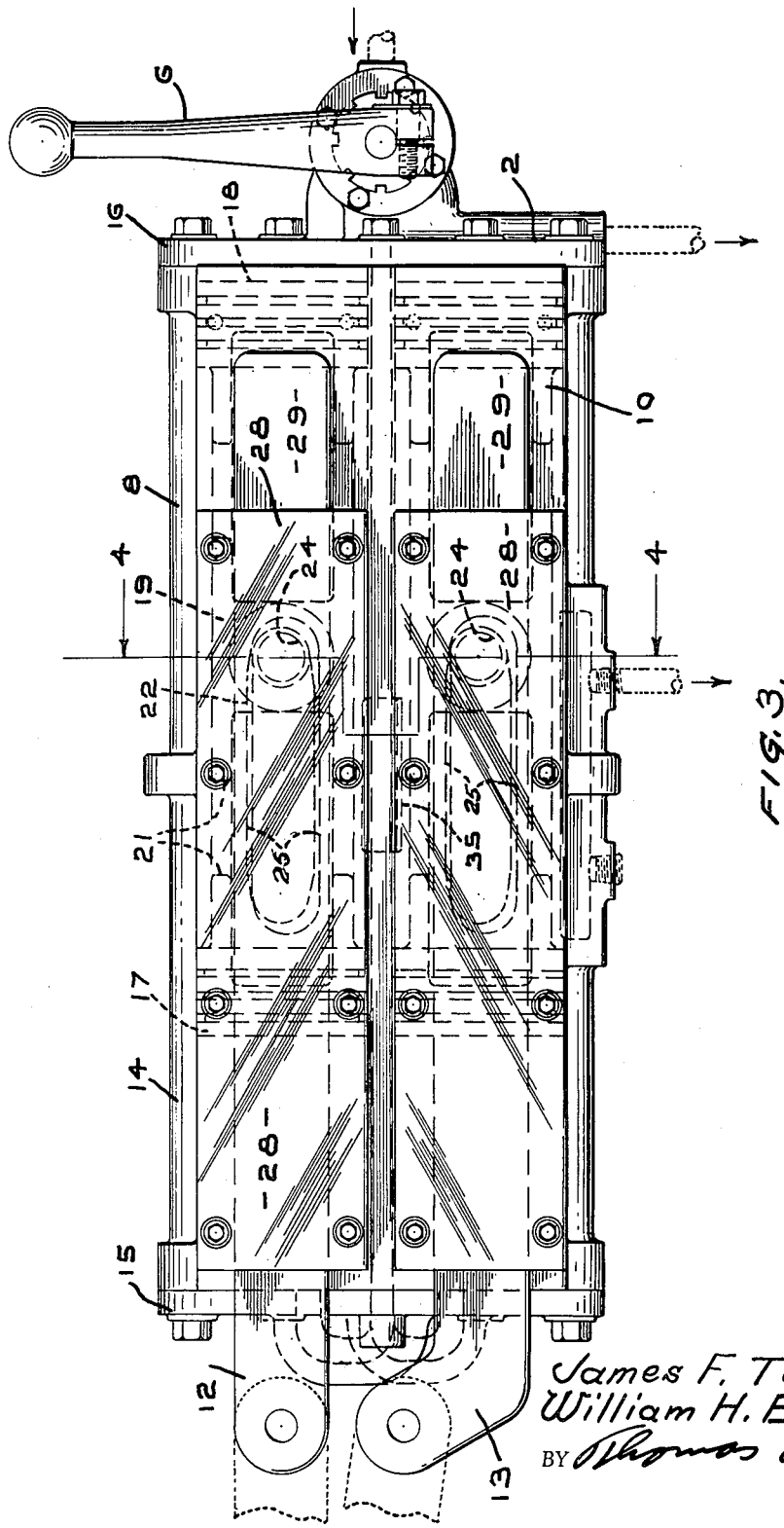

July 3, 1956  J. F. TURNER ET AL  2,752,756
HIGH PRESSURE FLUID MOTOR
Filed May 26, 1953  4 Sheets-Sheet 4

INVENTOR
James F. Turner and
William H. Bartman
BY Thomas W.Y. Clark
ATTORNEY 2,752,756
Patented July 3, 1956

2,752,756
HIGH PRESSURE FLUID MOTOR

James F. Turner and William H. Bartman, Baltimore, Md., assignors to Flynn & Emrich Company, Baltimore, Md., a corporation of Maryland Application May 26, 1953, Serial No. 357,552

7 Claims. (Cl. 60—97)

This invention relates to a high pressure fluid motor and is directed principally to means for preventing loss of the fluid. In such motors the fluid is under such heavy pressure in the cylinder heads as to leak through substantially any packing or packing rings available. Certain types of flexible packing materials have been used which, under the extreme pressure required for the operation of the pistons, are so compressed that they prevent the movement of the pistons.

It is the principal object of this invention to construct a motor to which this high pressure oil or fluid may be applied and to collect such of the oil as escapes around the pistons and to return it to the sump for further use in the operation of the pistons or motor. Other objects and advantages of the construction will be apparent from the following detailed description and accompanying drawings.

The invention is illustrated as applied to an incinerator stoker such as that shown in co-pending application Serial No. 303,758 filed August 11, 1952. It is, however, apparent that the motor may have other applications.

In the drawings forming a part hereof—

Figure 3 is a side elevational view of two of the motors embodying the invention.

Figure 1:
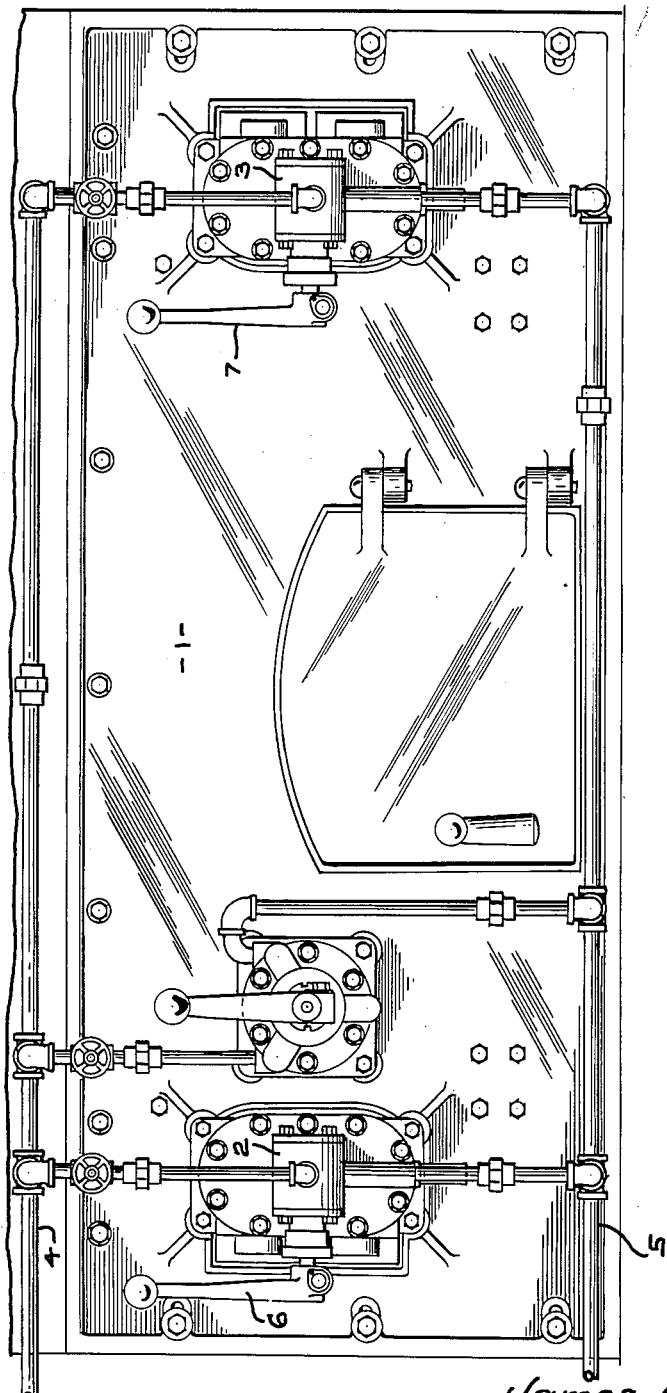
Figure 1 is an elevational view of the front of an incinerator stoker embodying this invention.
Figure 2:
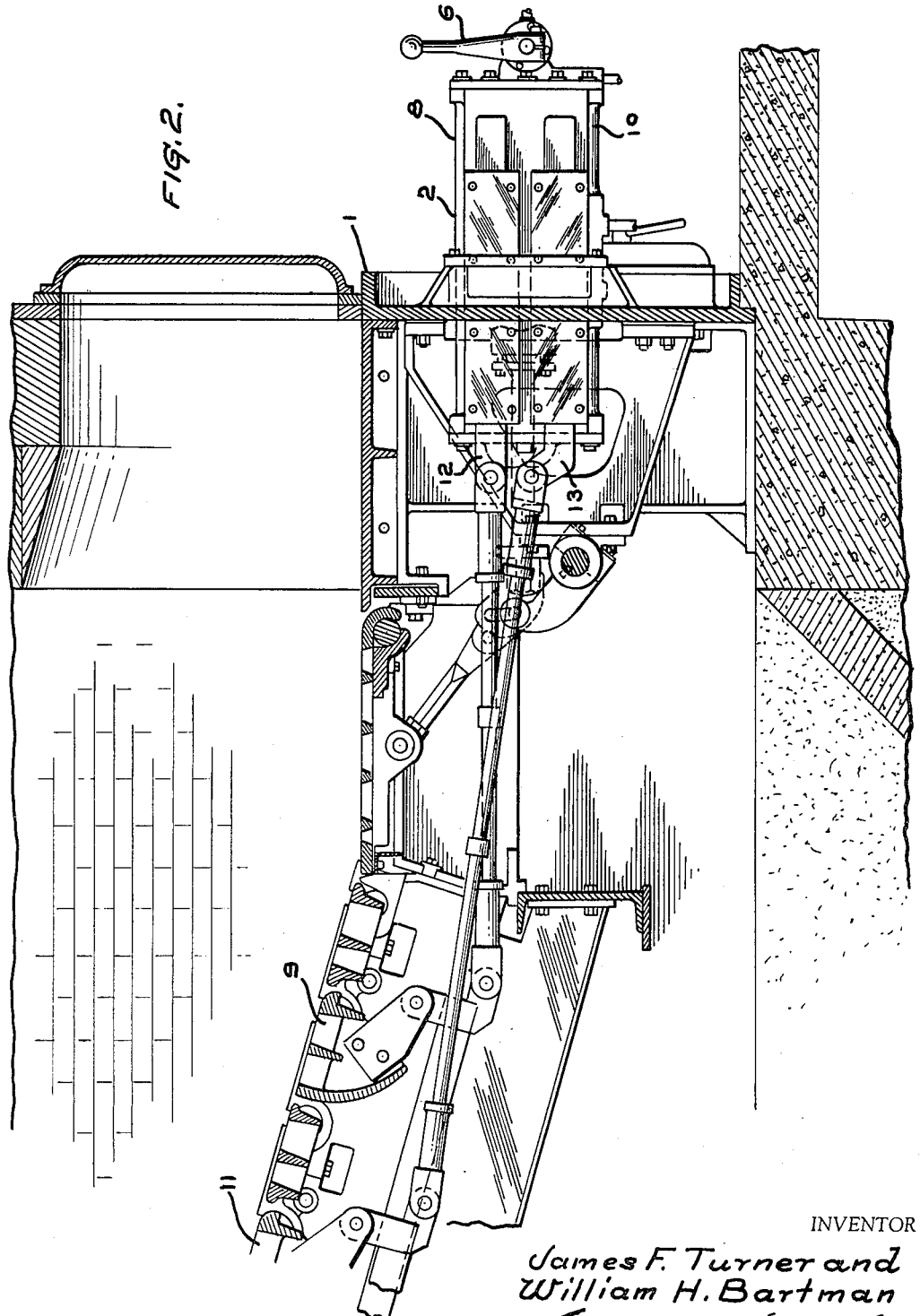
Figure 2 is a longitudinal sectional view thereof.

In the drawings similar numerals refer to similar parts throughout the several views. The front wall 1 of the stoker furnace has set therein the stoker motors 2 and 3 which are operated from an oil pressure line 4 and which have connected thereto oil exhaust line 5. Oil under high pressure is admitted to the pressure line 4. Oil is admitted to the respective cylinders of the respective motors through valves actuated by levers 6 and 7.

In the preferred construction two motors are arranged parallel, one superimposed upon the other. The upper motor 8 is illustrated as operating one group of stoker bars 9 and the lower motor 10 is shown as operating another group of stoker bars 11 through their respective piston rods 12 and 13.

Figure 5:
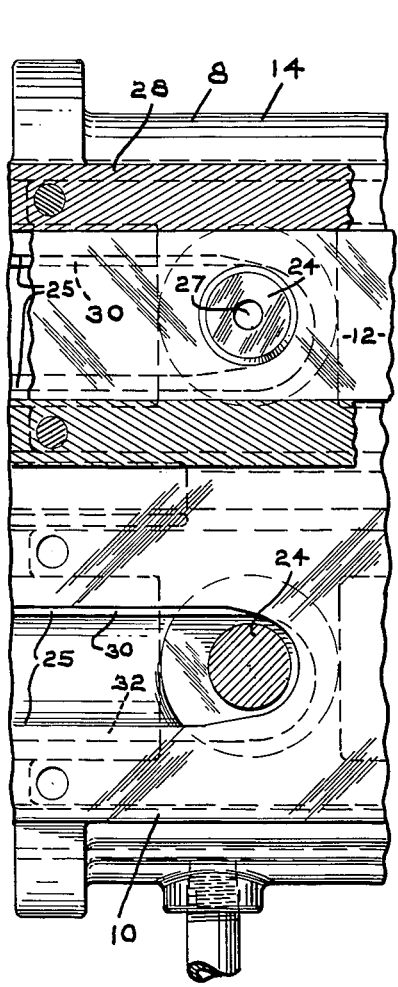
Figure 5 is a fragmentary view partly in section illustrating in detail the connecting pin slot.
Figure 4:
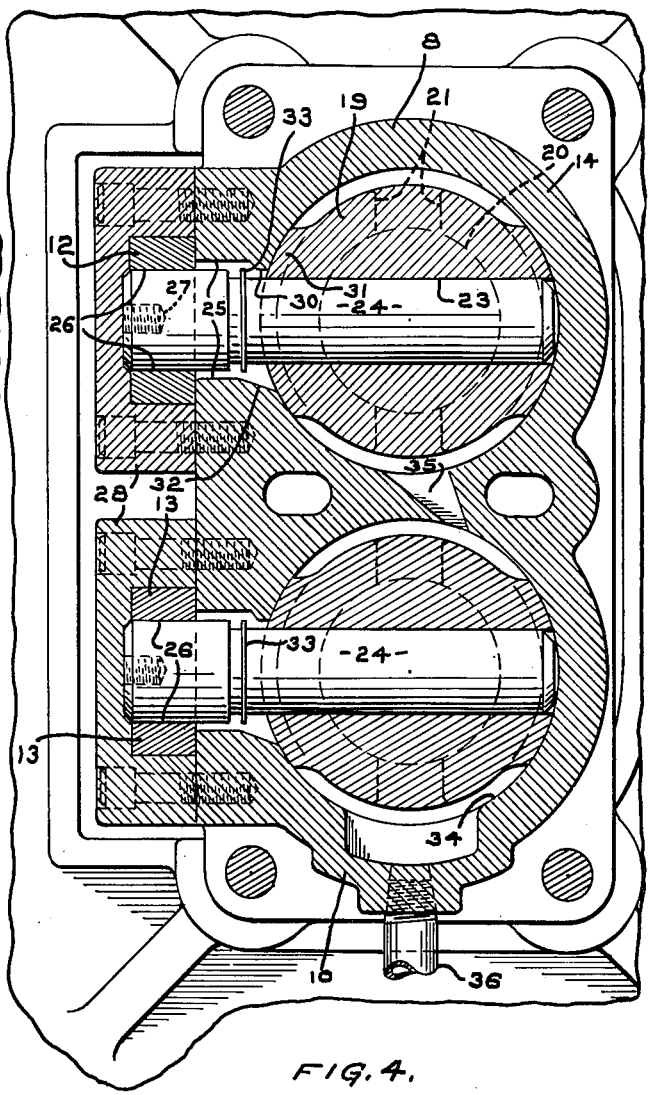
Figure 4 is a transverse sectional view on line 4—4 of Figure 3.

The two motors, one superimposed upon the other, are substantially alike and are best illustrated in detail in Figures 3 to 5 inclusive. The upper motor comprises a cylinder 14 having opposed cylinder heads 15 and 16 which are closed except for the passages for admitting fluid thereinto and discharging it therefrom. The cylinder has reciprocating therein a piston with heads 17 and 18 thereon connected by a yoke 19. The pistons may have piston rings thereon. The yoke is preferably hollow as shown at 20 and openings 21 lead thereinto. The central part of the yoke 22 has a transverse bearing 23 therein for connecting pin 24.

The cylinder 14 has a lateral opening or slot 25 therein in which the connecting pin 24 reciprocates, moved by the double headed piston. Piston rod 12 receives into opening 26 therein the head of the connecting pin 24. The connecting pin has a threaded hole 27 therein to receive a screw to pull the pin from the piston. Slot 25 has a cover 28 extending from over the slot at both ends to adjacent the working end of the piston rod to guide that rod in its reciprocating movements. The piston rod has an extending end 29, which extends beyond the connection of the piston rod to the connecting pin so as to cover the slot 25 at all times, the piston rod being adequately wide at its working end to also cover the slot. This complete covering of the slot substantially prevents any foreign material such as ash from entering the motor.

The habit of oil to creep along stationary horizontal surfaces is quite successfully controlled by the further features of this invention in which a lip 30 on the upper edge of the slot 25 closely hugs the boss 31 on the central bearing portion 22 of the piston and this lip 30 is positioned directly above the inwardly and downwardly sloping portion 32 of the lower edge of the slot 25 so that sloping portion 32 may catch any oil that may drop from the lip whether it follows the boss 31, or falls vertically and to guide that oil back into the cylinder 14, rather than permitting it to run outwardly from the slot. A ring 33 is placed around the connecting pin 24, or cut integrally with it, which is also above the sloping portion 32 of the lower wall of the slot, the ring collecting oil on the pin and substantially preventing it from creeping beyond the ring, the oil dropping from the ring to the sloping wall 32 and running from there back into the cylinder 14. The lower cylinder 34 has a similar piston, and connecting pin therein and piston rod and cover thereon. Between the cylinders 14 and 32 extends a passage 35 preferably directed toward the closed side of the lower cylinder as shown in Figure 4. This directed passage leads the oil to the back of the lower cylinder, away from the slot 25. The lower cylinder 34 has a drain 36 leading therefrom and to the sump for reserve oil. Oil running through opening 35 will either pass around the lower cylinder wall or through the hollow sections of the lower piston. Because of this construction all oil which passes the piston heads is thus collected from both the upper and lower sides of the slot and from the connecting pin and led back into the cylinders which serve not only to save all the oil thus escaping but it also keeps the oil from dropping out on the floor of the furnace, where it becomes a fire hazard whether in or out of the furnace.

As shown in Figure 1 there are four motors, two on each side and on each side one is located above the other. It is most desirable to make the parts as nearly interchangeable as possible and this has been accomplished by this construction in which the connecting pin may be placed in either side of the pistons and piston rods, and to not have a permanent connection therewith, being held therein between the cover guides and the interior of the cylinder walls.

The operation of the motors of this invention will be apparent from the above detailed description as will also the advantages of the precise oil saving and retaining features. It will also be apparent that various modifications may be made in the construction shown without departing from the invention.

What is claimed as new and is desired to be secured by Letters Patent is:

1. A substantially horizontally positioned high pressure fluid operated double acting reciprocating motor comprising a walled cylinder having oppositely acting heads at the ends thereof, a double headed piston reciprocable in said cylinder, a yoke connecting the pistons, a piston rod, a connection joining the rod to said yoke midway between the piston ends, the cylinder wall having a longitudinally extending lateral slot therein centrally between its ends and between the range of piston movement in which the piston rod connection reciprocates with the piston movements, the yoke having an outer lateral wall wiping the slot continuously in its reciprocation, the inner wall of the cylinder, adjacent the top of the lateral cylinder slot, having a downwardly projecting longitudinally extending lip wiping the piston yoke lateral wall to lead fluid from the slot and to the piston yoke and a drain in the bottom of the cylinder for collected fluid.

2. The motor of claim 1 in which the lower wall of the cylinder forming the lower edge of the slot beneath said lip slopes inwardly and downwardly toward the piston yoke to lead fluid in the slot to the piston yoke.

3. A substantially horizontally positioned high pressure fluid operated double acting reciprocating motor comprising a walled cylinder having oppositely acting heads at the ends thereof, a double headed piston reciprocable in said cylinder, a yoke connecting the pistons, a piston rod, a connection joining the rod to said yoke midway between the piston ends, the cylinder wall having a longitudinally extending lateral slot therein centrally between its ends and between the range of piston movement in which the piston rod connection reciprocates with the piston movements, the yoke having an outer lateral wall wiping the slot continuously in its reciprocation, the lower wall of the cylinder forming the lower edge of the slot sloping inwardly and downwardly toward the piston yoke to lead fluid in the slot to the piston yoke and a drain in the bottom of the cylinder for collected fluid.

4. A substantially horizontally positioned double acting reciprocating motor comprising a walled cylinder having oppositely acting heads at the ends thereof, a double headed piston reciprocable in said cylinder, a yoke connecting the pistons, a piston rod, a connecting pin joining the rod to said piston yoke midway between the piston ends, the cylinder wall having a lateral slot therein centrally between its ends and between the range of piston movement, in which the connecting pin reciprocates, the yoke of the pistons having laterally extending bosses thereon contacting the cylinder wall to guide the pistons, the boss adjacent the slot forming an internal closure therefor, the inner wall of the top of the lateral cylinder slot having a downwardly projecting lip wiping the said adjacent piston yoke boss to lead fluid from the slot to the piston yoke, the lower wall of the cylinder forming the lower edge of the slot, beneath said lip, sloping inwardly and downwardly toward the piston yoke boss to lead fluid in the slot to the piston yoke, and a drain in the bottom of the cylinder for collected fluid.

5. A substantially horizontally positioned double acting reciprocating motor comprising a walled cylinder having oppositely acting heads at the ends thereof, a double headed piston reciprocable in said cylinder, a yoke connecting the pistons, a piston rod, a connecting pin joining the rod to said piston yoke midway between the piston ends, the cylinder wall having a longitudinally extending lateral slot therein, centrally between its ends and between the range of piston movement, in which the connecting pin reciprocates with the piston movements, the yoke having an outer lateral wall wiping the slot continuously in its reciprocation, the inner wall of the cylinder, adjacent the top of the lateral cylinder slot, having a downwardly projecting longitudinally extending lip wiping the piston yoke lateral wall to lead fluid from the slot to the piston yoke, the lower wall of the cylinder forming the lower edge of the slot beneath said lip sloping inwardly and downwardly toward the piston yoke to lead fluid in the slot to the piston yoke, a ring around said connecting pin, above the lower sloping slot wall, to collect fluid from the pin and drop it to the sloping wall, and a drain in the bottom of the cylinder for collected fluid.

6. A substantially horizontally positioned double acting reciprocating motor comprising a cylinder having oppositely acting heads at the ends thereof, a double headed piston reciprocable in said cylinder, a yoke connecting the pistons, a piston rod, a connecting pin joining the rod to said piston yoke midway between the piston ends, the cylinder having a longitudinally lateral slot therein, centrally between its ends and between the range of piston movement, in which the connecting pin reciprocates, a piston rod cover guide extending longitudinally over said slot, the piston rod moving longitudinally of the cylinder in said guide, and the piston rod having slot covering extensions extending beyond the connecting pin on both sides closely covering the slot at all times to exclude foreign material therefrom.

7. A pair of substantially horizontally positioned high pressure fluid operated double acting motors, one superimposed above the other, each comprising a walled cylinder having oppositely acting heads at the ends thereof, a double headed piston reciprocable in each said cylinder, yokes connecting the pistons, piston rods, connections joining the rods to said respective yokes, midway between the piston ends, the cylinders each having a lateral slot therein centrally between its ends and between the range of piston movement in which the piston rod connections reciprocate, means to drain fluid from the lateral cylinder slots to the respective piston yokes, the cylinder walls having a drain between the two cylinders for the passage of fluid from the upper cylinder to the lower cylinder, the lower cylinder wall having a drain therein for collected fluid, both said drains being centrally between the cylinder ends and between the range of piston movement, the yoke of the lower piston having a passage therein for the passage of fluid between the two drains.

References Cited in the file of this patent

UNITED STATES PATENTS

| 995,423 | Ellis | June 13, 1911 |
| 1,035,899 | Pearson | Aug. 20, 1912 |
| 1,588,972 | Machacek | June 15, 1926 |
| 1,975,370 | Morrison | Oct. 2, 1934 |